United States Patent [19]

Agar et al.

[11] Patent Number: 5,589,642

[45] Date of Patent: Dec. 31, 1996

[54] HIGH VOID FRACTION MULTI-PHASE FLUID FLOW METER

[75] Inventors: Joram Agar, Grand Cayman, Cayman Islands; David Farchi, Houston, Tex.

[73] Assignee: Agar Corporation Inc., Houston, Tex.

[21] Appl. No.: 305,344

[22] Filed: Sep. 13, 1994

[51] Int. Cl.$^6$ .................................................. G01F 1/74
[52] U.S. Cl. .................................................. 73/861.04
[58] Field of Search .............................. 73/197, 861.04, 73/861.63

[56] References Cited

U.S. PATENT DOCUMENTS

| | | | |
|---|---|---|---|
| 4,312,234 | 1/1982 | Rhodes et al. | 73/861.04 |
| 4,480,947 | 11/1984 | Nagasaka | 73/861.04 |
| 4,662,219 | 5/1987 | Nguyen | 73/195 |
| 5,036,710 | 8/1991 | King | 73/861.04 |
| 5,099,697 | 3/1992 | Agar | 73/861.04 |
| 5,195,380 | 3/1993 | Hatton et al. | |
| 5,390,547 | 2/1995 | Liu | 73/861.04 |
| 5,396,807 | 3/1995 | Dowty et al. | 73/861.04 |
| 5,400,657 | 3/1995 | Kolpak et al. | 73/861.04 |
| 5,423,205 | 6/1995 | Farchone | 73/861.04 |

Primary Examiner—Richard Chilcot
Assistant Examiner—Jewel Artis
Attorney, Agent, or Firm—Rosenblatt & Redano, P.C.

[57] ABSTRACT

A high void fraction multi-phase fluid flow meter and method, wherein a first fluid flow path including a multi-phase flow measuring device disposed in series with a liquid flow restrictor is provided in parallel with a second fluid flow path including a gas flow measuring device. The presence of liquid flow in the flow meter is detected. When liquid flow is detected, a valve in the second fluid flow path operates to cut off fluid flow through the second fluid flow path. Otherwise the valve in the second fluid flow path operates to divert gas flow through the second fluid flow path. Alternatively, a negative pressure differential is produced across the second fluid flow path when liquid flow is present, by passing the incoming liquid flow through a jet pump nozzle, to prevent liquid flow into the second fluid flow path. A check valve is then disposed in the second fluid flow path to prevent backflow from the output of the multi-flow measuring device into the second fluid flow path. A computer outputs an indication of the liquid flow, typically oil flow and water flow, through the multi-phase flow meter, and the combined total amount of gas flow through the two flow meters.

25 Claims, 3 Drawing Sheets

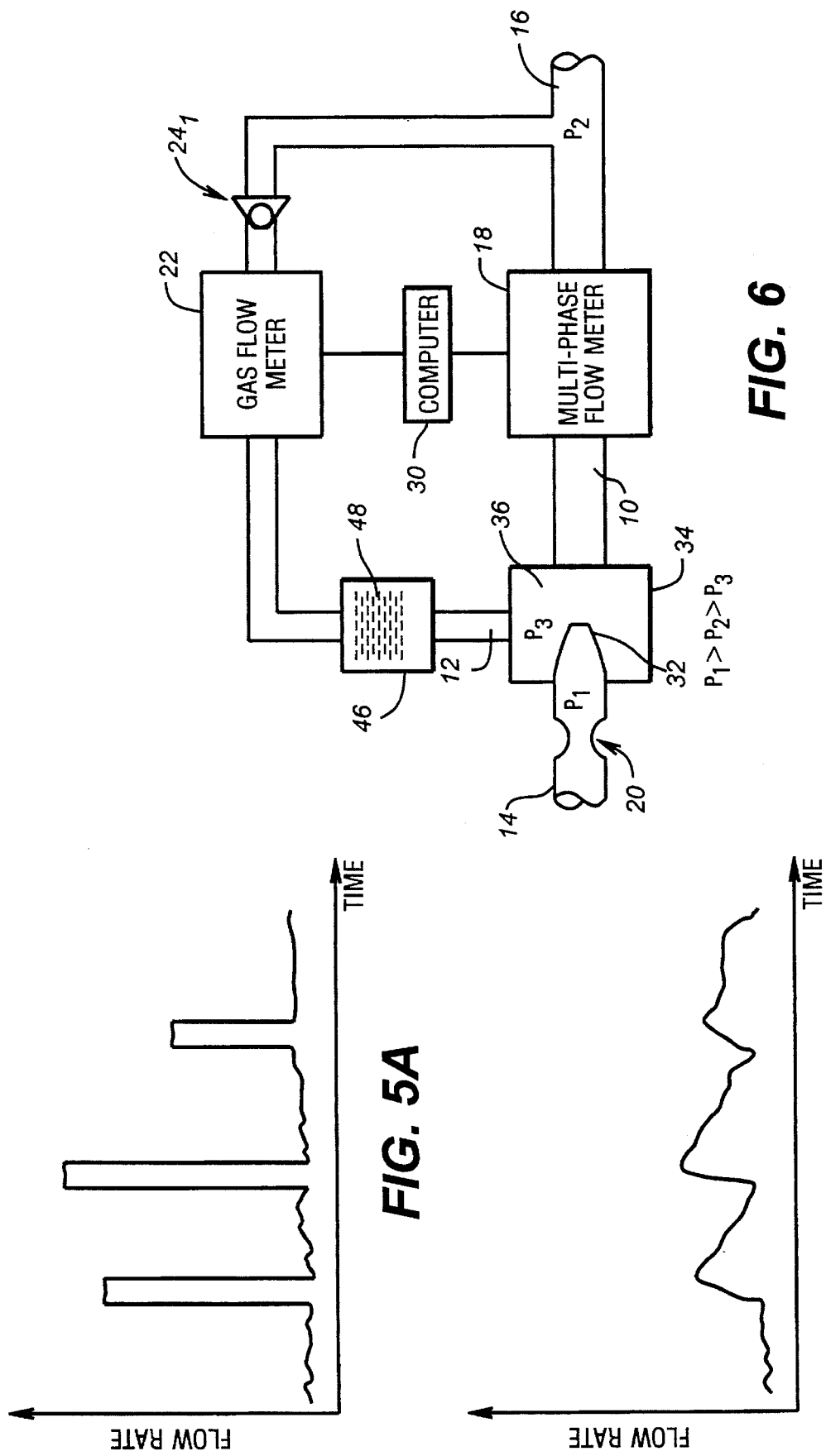

HIGH VOID FRACTION MULTI-PHASE FLUID FLOW METER

BACKGROUND OF THE INVENTION

1. Field of the Invention

This invention relates to multi-phase fluid flow meters and, in particular, multi-phase fluid flow meters capable of accurately measuring the flow of gas and liquid components of fluid flow over a wide range of fluid concentrations from high liquid voids, where the fluid to be measured is substantially void of liquid, to fluids including a substantial liquid component.

2. Discussion of Background

In the oil industry, it is often necessary to measure the output of oil wells under varying conditions. In particular, oil wells typically have fluid outputs including gas and liquid components, with the liquid components typically including water and oil. In order to reliably measure the quantity of each component in the oil well output, U.S. Pat. No. 5,099,697 discloses a multi-phase flow meter (MPFM) for measuring multi-phase fluid flow, and particularly three phase fluid flow including gas, water and oil. However, for oil wells which produce more than 97% gas by volume, it is very difficult to measure accurately the flow of each fluid component as the MPFM must be sized for the gas volumetric flow, while the liquid flow may be only a fraction of a percent. Under such circumstances which demand a wide operating dynamic range, accuracy over the entire range of operation, including the measuring of high void fraction fluids, i.e., high gas concentration fluids, is compromised.

SUMMARY OF THE INVENTION

Accordingly, the object of this invention is to provide a novel multi-phase fluid flow meter capable of operating with high accuracy over a wide range of fluid concentrations, including fluids having high void fractions.

This object and other objects are achieved according to the present invention by providing a new and improved high void fraction multi-phase fluid flow meter, including a first fluid flow path in which is disposed a multi-phase flow measuring device for measuring gas and liquid flow and a restrictor coupled in series with the multi-phase flow measuring device thereby to slow the flow of fluid through the measuring device when the fluid includes liquid, a second fluid flow path provided in parallel with the first fluid flow path and in which is disposed a gas flow measuring device for measuring gas flow, means for detecting liquid flow in said flow meter, means for diverting flow of gas into the second fluid flow path when liquid flow is not detected in the flow meter, and means for outputting an indication of an amount of liquid flow through the multi-phase flow measuring device and combined total gas flow through the multi-phase flow measuring device and the gas flow measuring device.

In one embodiment of the flow meter of the present invention, the diverting means includes a valve disposed in series with the gas flow measuring device. A pressure drop across the restrictor is detected and compared with a predetermined threshold, and if that threshold is exceeded, as occurs in the presence of liquid flow through the restrictor, the valve operates to cut off gas flow through the second fluid flow path.

In another embodiment, the presence of liquid flow at an inlet to the first fluid path is detected and the detected presence of liquid flow is used to actuate the valve to cut of gas flow through the second fluid flow path. In this embodiment, the presence of liquid is typically detected by passing the fluid being measured through a flow restricting nozzle, such as a nozzle of a jet pump, to produce a pressure drop in the presence of liquid flow, with the pressure drop being detected and utilized to actuate the valve to cut off gas flow through the second fluid flow path. Alternatively, a venturi device is provided at the inlet to the first fluid flow path. The pressure drop across the throat of the venturi device is utilized to detect the presence of liquid flow and based thereon actuate the valve to cut off gas flow through the second fluid flow path. Alternatively, the presence of liquid flow is measured by means of a densiometer which measures the density of the fluid at the inlet to the first fluid flow path and when the measured density indicates the presence of liquid flow, the valve in the second fluid flow path is actuated to cut off gas flow through the second fluid flow path. On the other hand, when liquid flow is not detected in any of the above embodiments, the valve operates to divert gas flow through the second fluid flow path so that gas flow is metered by the gas flow measuring device and the multi-phase flow measuring device.

In another embodiment according to the present invention, the diverting means includes a pressure reduction device, such as a flow restricting nozzle of a jet pump, at a point upstream of the inlet to the second fluid flow path. In the presence of liquid flow, a negative differential pressure is produced across the second fluid flow path thereby to prevent fluid flow through the second fluid flow path. This negative differential pressure may create a reverse circulation flow from the multi-phase flow measuring device to the second fluid flow path. Therefore, to prevent a reverse circulation flow, a check valve is inserted in the second fluid flow path. An expansion chamber and a de-mister, to knock off any misty droplets carried by the gas, is preferably included in the second fluid flow path at an inlet thereto.

Preferably, the multi-phase flow measuring device disposed in the first fluid flow path is a three phase flow meter capable of measuring the concentration of gas, water and oil in the fluid under measurement. In that case, the flow meter of the present invention outputs an indication of the total water flow and the total oil flow measured by the three phase flow meter as well as the combined total gas flow measured by both the three phase flow meter and the gas flow measuring device. However, the present invention also applies where a two-phase flow meter is used to measure flow of gas and liquid (oil and water) in the first fluid flow path, and in that instance the present invention outputs an indication of liquid flow through the two-phase flow meter and combined total gas flow through the two-phase flow meter and the gas flow measuring device.

The present invention further includes a new and improved method of measuring multi-phase fluid flow of a fluid, including providing a flow meter having first and second fluid flow paths in parallel with each other, with the first fluid flow path including a multi-phase flow measuring device for measuring both gas flow and liquid flow and a liquid flow restrictor coupled in series with the multi-phase flow measuring device to slow the flow of liquid through the multi-phase flow measuring device, and the second fluid flow path including a gas flow measuring device for measuring gas flow; detecting liquid flow in the flow meter; controlling fluid flow through the first and second fluid flow paths by diverting fluid flow through the second fluid flow path when the detecting step does not detect liquid flow in the flow meter and cutting off fluid flow through the second fluid flow path when the detecting step detects liquid flow in the flow meter; and outputting an indication of the amount of liquid flow through the multi-phase flow measuring device and the combined total amount of gas flow through the multi-phase and gas flow measuring devices.

A first embodiment of the method invention includes detecting a pressure drop across the flow restrictor provided in series with the multi-phase flow measuring device and actuating a valve to cut off gas flow through the second fluid flow path when the pressure drop detected exceeds a predetermined threshold.

In a second embodiment of the method of the present invention, the presence of liquid flow is detected at an inlet to the first fluid flow path, for example, by producing a pressure drop at the inlet upon the presence of liquid flow, such as by passing the liquid under measurement through either a flow restricting nozzle or a venturi device having a throat, and detecting the resulting pressure drop across the flow restricting nozzle or the venturi device in the presence of liquid flow. Alternatively, the method includes measuring one or more of predetermined properties of the fluid flowing at the inlet, such as the fluid's density, thermal conductivity, electrical conductivity, optical opacity, or absorption of nuclear, electromagnetic or sound waves, or other properties such as taught in U.S. Pat. No. 4,774,680, e.g., current, voltage, frequency, energy absorption, dielectric constant, capacitance, admittance and impedance, and actuating the valve to cut off gas flow through the gas flow measuring device when the measured property indicates the presence of liquid flow.

In another embodiment of the method of the present invention, a negative differential pressure is created when liquid is present by means of a jet-pump. Circulating flow of liquid is prevented by means of a check-valve in the second fluid flow path. An expansion chamber and a demister in bypassing second fluid flow path helps to collect carry-over liquid droplets. The expansion chamber and demister can be added to each of the embodiments of the present invention.

In a preferred embodiment of the method of the present invention, a three phase flow meter for measuring the flow of gas, water and oil is employed as the multi-phase flow measuring device in the first fluid flow path. In the preferred embodiment, an indication of the amount of water flow and the amount of oil flow through the three phase flow meter is outputted, as well as an indication of the combined total amount of gas flow flowing through the three phase flow meter and the gas flow measuring device. Alternatively, when a two-phase flow measuring device is employed in the first fluid flow path, the method of the present invention includes outputting an indication of liquid flow through the two-phase flow meter and an indication of combined total gas flow through the two-phase flow meter and the gas flow measuring device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5a and 5b are time charts illustrating fluid flow through the multi-phase fluid flow measuring device in a first flow path of the flow meter of the present invention both without and with, respectively, the presence of a restrictor in the first fluid flow path; and FIG. 6 is a schematic block diagram of a fifth embodiment of the present invention.

DESCRIPTION OF THE PREFERRED EMBODIMENTS

Figure 1:
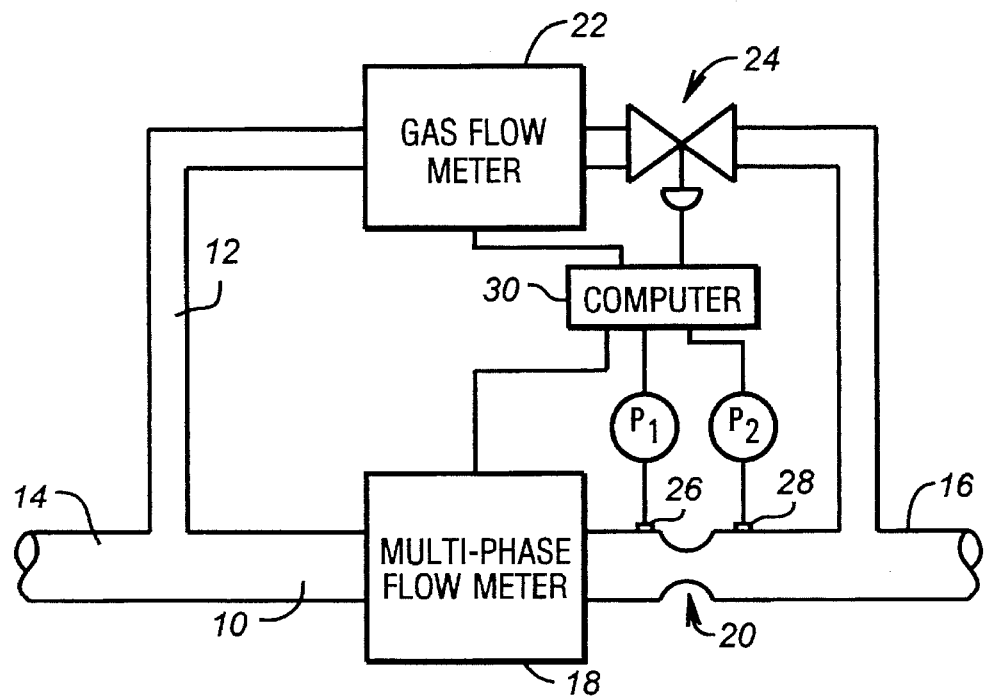
FIG. 1 is a schematic block diagram of a first embodiment of the high void fraction multi-phase fluid flow meter of the present invention.

Referring to the drawings, wherein like reference numerals designate identical or corresponding parts throughout the several views, and more particularly to FIG. 1 thereof, a first embodiment of the flow meter of the present invention includes a first fluid flow path 10 and a second fluid flow path 12 connected in parallel to the path 10, both paths in communication with an input connecting pipe 14 at inputs thereto and an output connecting pipe 16 at outputs thereto. The first fluid flow path 10 includes a multi-phase fluid flow meter 18, preferably implemented as taught in commonly owned U.S. Pat. No. 5,099,697, coupled in series with a restrictor 20, the output of the restrictor 20 communicating with the output connecting pipe 16. The second fluid flow path 12 includes a gas flow meter 22 coupled in series with a valve 24 which in turn is coupled to the output of the first fluid flow path and the output connecting pipe 16.

As shown in FIG. 1, pressure sensors 26 and 28 are provided at the input and the output of the restrictor 20. Sensors 26 and 28 have respective outputs applied to a computer 30 which determines the difference between the pressure sensed by the pressure sensors 26 and 28, compares the difference to a threshold, and actuates the valve 24 when the pressure difference exceeds a predetermined value indicative of liquid flow through the restrictor 20. Computer 30 otherwise maintains the valve 24 open to permit gas flow through the second fluid flow path when the detected pressure drop across the restrictor 20 is less than the predetermined threshold, which is indicative of substantial gas flow through the restrictor 20.

The present invention takes advantage of the recognition that in most cases, droplets of liquid in the fluid flow tend to bunch together (as happens in klystrons chromatographs, etc.) and would appear at the flow meter 18, in the absence of the restrictor 20, as a short duration spike of mainly liquid mixed with gas, as shown in FIG. 5a. However, it is difficult to measure accurately the amount of liquid flow in high velocity short duration spikes as shown in FIG. 5a. This is true because of the finite response time of the flow meter 18 and because the possibility of damaging flow meter 18. According to the present invention, the difficulty is overcome by slowing the fluid spike to produce a liquid slurry, i.e., by packing more liquid in the flow path 10. Therefore, according to the present invention, the restrictor 20 is provided to "iron out" the sharp spikes so that the fluid flow appears at the flow meter 18 as a slug of decreased velocity and amplitude and increased time duration. Since the input connecting pipe 14 is not packed with incompressible fluid, i.e., is packed with a gas/liquid mixture, restrictor 20 prolongs the duration of the liquid slug through the flow meter 18 by packing more liquid upstream of the flow meter 18. Thus, the restrictor 20 slows the flow of the liquid-gas mixture through the flow meter 18 and causes it to pack-up in front of the flow meter 18 as fluid slugs shown schematically in FIG. 5b.

Typically, the restrictor 20 is dimensioned to limit the maximum liquid flow through the flow meter 18 to 150% of the full-scale rating of the volumetric flow meter section of flow meter 18. For example, if flow meter 18 is implemented according to U.S. Pat. No. 5,099,097, it would include two volumetric flow meter sections separated by a restriction. In that instant, the restrictor 20 is dimensioned to limit the maximum liquid flow to 150% of the full scale rating of the smaller of the two volumetric flow meter sections. If on the other hand, a multi-phase flow meter as taught in copending U.S. patent application Ser. No. 08/852,544, incorporated by reference herein, which includes a volumetric flow meter section in series with a momentum flow meter section, is used, then restrictor 20 is sized to limit liquid flow to 150% of the full-scale rating of the volumetric flow meter section. Thus, in the present invention, the flow meter 18 is sized for the maximum liquid flow and the flow meter 22 is sized for the maximum gas flow. At high void fraction, e.g., 95% void fraction, the superficial gas flow is much higher than the superficial liquid flow, i.e., approximately 20:1 higher, and the flow meters 22 and 18 are sized accordingly.

Further elaborating on the role of the restrictor 20, as the differential pressure p across the restrictor is proportional to the fluid velocity squared ($V^2$) times the density (D), i.e., $p=DV^2$, since the density of the gas is quite small in comparison to the density of the liquid, gas flow through the restrictor 20 will hardly be affected, whereas since the density of the liquid is much greater than the density of the gas, the pressure loss for the liquid, for the same velocity, is much greater than the pressure loss for gas passing through the restrictor 20. Thus, as previously indicated, the restrictor 20 slows down liquids, and not gases, and results in a measurable pressure drop in the presence of liquid. Since the liquid flow peaks are "ironed out" as shown in FIG. 5b, the flow meter 18 can thus be made much smaller than would otherwise be necessary to accommodate the peak superficial gas flow rate, as the restrictor 20 determines the maximum flow rate.

According to the present invention as above indicated, the pressure sensors 26, 28 and the computer 30 are utilized to detect the presence of liquid flow through the restrictor 20 and actuate the valve 24 to cut off gas flow through the gas flow meter 22 so that all the fluid from the input connecting pipe 14 passes through the multi-phase flow meter 18 in the presence of liquid flow. In the presence of substantial gas flow and inconsequential liquid flow, i.e., in the presence of high void fraction fluid flow, little pressure drop is detected across the restrictor 20, resulting in gas flow through both the first and second fluid flow paths and gas measurement by both the multi-phase flow meter 18 and the gas flow meter 22. In the operation as above described, the restrictor slows down the liquids, but not the gases. The flow meter 18 can thus be designed to measure maximum liquid flow rates much lower than would otherwise be required if it had to measure the maximum gas flow rate as well. Restrictor 20 determines the maximum liquid flow rate as a result of which flow meter 18 experiences much smaller flows. This cannot be done in a single-phase fluid flow in which the line 14 would have no spare space to pack more liquid in it, but does apply to multi-phase flow including gas flow.

Valve 24 in FIG. 1 is shut when the differential pressure across restrictor 20 exceeds a predetermined value, i.e. when a mixture of liquid and gas is flowing through it. Flow path 12 is bigger than flow path 10, and as the liquid is substantially incompressible, the position of restrictor 20 is immaterial whether it is upstream or downstream of flow meter 18. The advantage of inserting it downstream is that absolute pressure in flow meter 18 is maintained higher, thus it sees a smaller actual gas flow rate. The disadvantage is that more liquid will enter by-pass flow path 12 before the valve 24 will shut. The vertical riser of by-pass path 12 requires a larger differential pressure than the differential pressure across the restrictor 20. Valve 24 then will shut long before the riser fills up preventing flow of liquid through path 12.

Data on the flow rates of gas, water and oil passing through the flow meter 18 are applied to the computer 30 along with the outputs of the pressure sensors 26 and 28. The computer 30 controls activation of the valve 24 to allow the high velocity gas to flow through the second fluid flow path 12 which serves as a by-pass for the high velocity gas. The flow of gas through the second fluid flow path 12 is metered by the gas flow meter 22, the output of which is also applied to the computer 30. At high gas flow rate where the flow meter 18 runs at 150% of its normal gas flow rate, the differential pressure across the restrictor is relatively small, so the computer 30 causes the valve 24 to be maintained open and permits excess gas to be metered by the gas flow meter 22. The computer 30 then outputs an indication of the liquid flow, i.e., water flow and oil flow measured by the flow meter 18, as well as a combined total gas flow measured by the flow meters 18 and 22. Where a two-phase flow meter is used for the flow meter 18, then the computer outputs an indication of liquid flow through the flow meter 18 as well as combined total gas flow through the flow meters 18 and 22.

Figure 2:
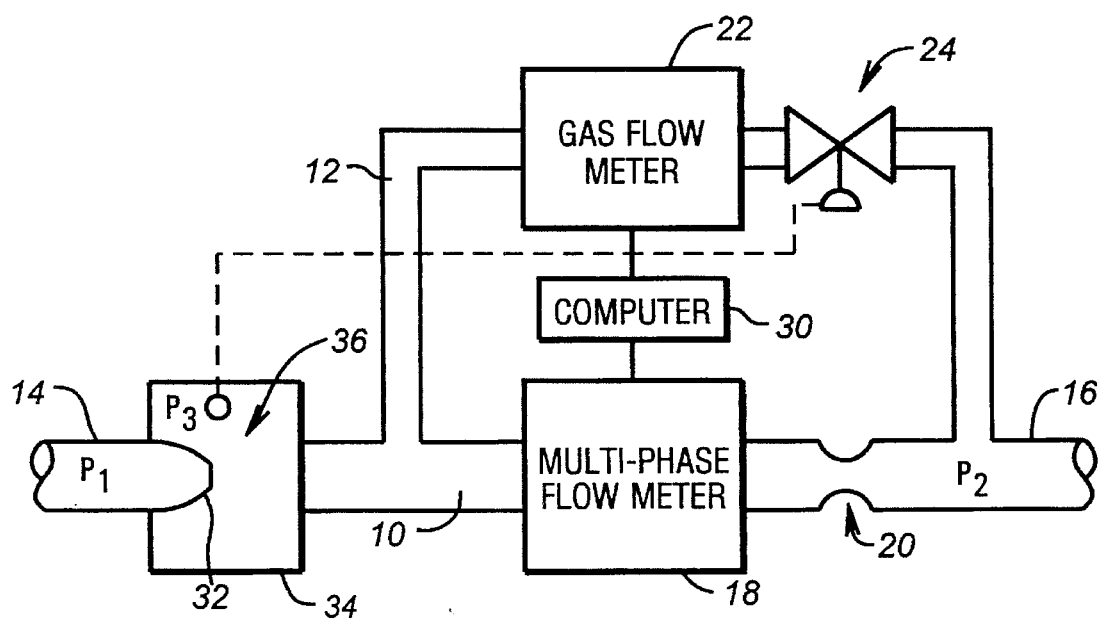
FIG. 2 is a schematic block diagram of a second embodiment of the flow meter of the present invention.

FIG. 2 shows a second embodiment of the invention which likewise results in the cut off of gas flow through the gas flow meter 22 upon detection of the presence of liquid flow in the flow meter. In the embodiment of FIG. 2, however, operation of the valve 24 is controlled based on the pressure drop produced by liquid flow through the nozzle 32 of a jet pump 34 which is installed upstream of flow meter 18. In FIG. 2, the valve 24 is controlled by the suction created by the jet pump 34 when liquid passes through the jet pump 34. When liquid flows through the nozzle 32 of the jet pump 34, a lower pressure is created in the chamber 36. Valve 24 is schematically shown in FIG. 1 and can be either a pneumatic or hydraulic diaphragm valve, or a solenoid operated valve. The valve 24 is normally open, but shuts off when liquid flow is detected. The advantage of using a normally open valve is that if there is a power failure, the line is not blocked to gas flow by the flow meter. The reduced pressure produced by liquid flow is utilized to shut off the reverse acting valve 24, causing the valve 24 to cut off gas flow through the second fluid flow path 12. When gas passes through the nozzle 32, pressure in the chamber 36 is essentially the same as in the main line 38 feeding the jet pump 34, and valve 24 opens under the action of a reverse acting spring (not shown). Thus, liquid-gas mixture slugs are metered by the multi-phase flow meter 18 while high flowing gas is metered by both the flow meters 18 and 22. As in the first embodiment, the computer 30 outputs indications of the water flow and the oil flow through the multi-phase flow meter 18 and the combined total gas flow through the flow meters 18 and 22 when a three-phase flow meter 18 is employed and otherwise outputs an indication of the liquid flow through the flow meter 18 and the combined total gas flow through the flow meters 18 and 22 when a two-phase flow meter 18 is employed.

Figure 3:
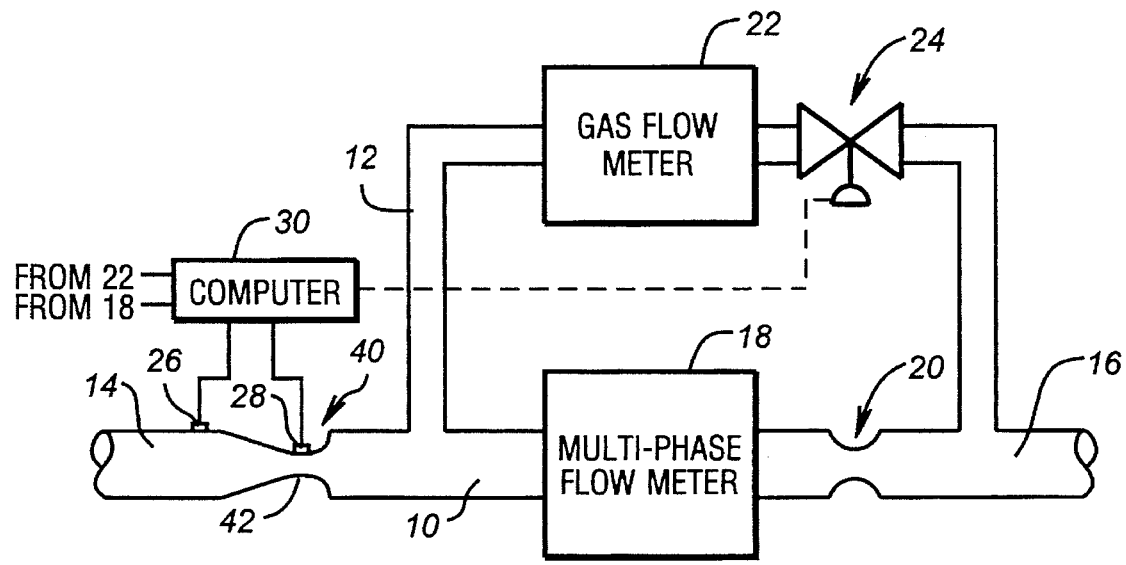
FIG. 3 is a schematic block diagram of a third embodiment of the flow meter of the present invention.

In another embodiment shown in FIG. 3, the jet pump 34 is replaced by a venturi 40 having a throat 42. In the FIG. 3 embodiment, the low pressure created at the throat 42 of the venturi operates the reverse acting valve 24 in a similar manner to the operation of the jet pump of FIG. 2. The advantage of this embodiment is that very little pressure is lost across the venturi 40 and most of the pressure dropped at the throat 44 is recovered by the expander section of the venturi downstream of the throat 42.

Figure 4:
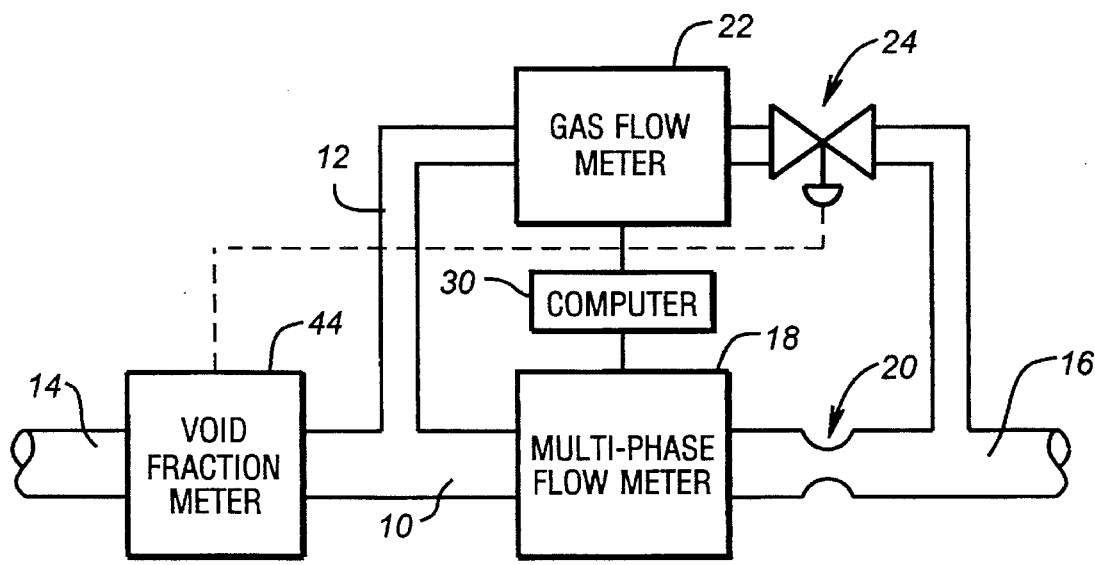
FIG. 4 is a schematic block diagram of a fourth embodiment of the flow meter of the present invention.

In FIG. 4, the venturi is replaced with a void fraction meter 44, which operates valve 24 in a similar manner as described with respect to the embodiment of FIG. 1. Void fraction meter 44 can be a device measuring the density of the fluid (nuclear, differential pressure, etc.) or other known void fraction meter devices. There are many types of void fraction meters: e.g. dielectric, electrical or thermal conductivity, optical, etc. They all measure how dense the fluid is. Use of a density meter is reserved for meters that measure the density of the fluid in weight/volume units.

FIG. 6 illustrates another embodiment of the present invention, and in this embodiment the differential pressure across the nozzle 32 of the jet pump 34 in the chamber 36 is used to prevent fluid flow through the flow path 12. The pressure in line 12 is substantially the same as at the outlet of MPFM 18. The Jet Pump creates a suction (lower pressure) which would suck liquid back from the outlet of MPFM 18, if this were not prevented. When a slug of liquid-gas mixture goes through the jet 34, it creates a pressure drop larger than the pressure drop across the multi-phase flow meter 18. In this embodiment, a check valve $24_1$ is employed in the by-pass fluid flow path 12. Check valve $24_1$ closes to prevent backflow from the output of the flow meter 18 which might otherwise result due to the pressure drop caused by the flow of liquid through the nozzle 32. Thus, backflow through the flow path 12 from the output of the flow meter 18 is prevented by the check valve. The fluid mixture passes through to the multi-phase fluid flow meter 18 and to the output connecting pipe 16. In the presence of gas passing through the nozzle 32, the differential pressure in the chamber 46 is quite small compared with that in the by-pass path 12, and most of the flow goes through the by-pass where it is metered by the gas flow meter 22.

The expansion chamber 46 provided upstream of the flow meter 22 slows the flow of fluid to the flow meter 22, and allows any droplets of liquid carryover to drop back into the chamber 36. Adding a de-mister 48 enhances the effect. The expansion chamber 46, with or without a de-mister 48, can be used to advantage in any of the embodiments of the present invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A high void fraction measuring multi-phase fluid flow meter for measuring flow of a multi-phase fluid, comprising:

a first fluid flow path including a first flow measuring device for measuring gas and liquid flow and a restrictor coupled in series with said first flow measuring device thereby to slow the flow of fluid through said first flow measuring device when said fluid includes liquid;

a second fluid flow path in parallel with said first fluid path and including a second flow measuring device for measuring gas flow;

means for detecting liquid flow in said flow meter;

means for diverting flow of gas into said second fluid flow path liquid flow when liquid flow is not detected by said detecting means;

means for outputting an indication of the amount of liquid flow through said first flow measuring device and combined total amount of gas flow through said first and second flow measuring devices.

2. The flow meter of claim 1, wherein said diverting means comprises:

valve means disposed in said second fluid flow path and operable to cut off gas flow in said second fluid flow path when liquid fluid flow is detected by said detecting means.

3. The flow meter of claim 2, wherein said detecting means comprises:

means for measuring a pressure drop across said restrictor and actuating said valve means when the pressure drop across said restrictor exceeds a predetermined threshold.

4. The flow meter of claim 2, wherein said detecting means comprises:

means for detecting a presence of liquid flow at an inlet to said first fluid flow path and for actuating said valve means to cut off liquid gas flow through said second fluid flow path when the presence of liquid flow is detected at said inlet.

5. The flow meter of claim 4, wherein said means for detecting comprises:

means for producing a pressure drop at said inlet when liquid flow is present at said inlet and actuating said valve means to cut off liquid flow through said second fluid flow path when the detected pressure drop at said inlet exceeds a predetermined value.

6. The flow meter of claim 5, wherein said means for producing a pressure drop at said inlet when liquid flow is present comprises:

a flow restricting nozzle.

7. The flow meter of claim 4, wherein said means for detecting comprises:

a venturi device having a throat provided at said inlet; and means for detecting a pressure drop across said throat and actuating said valve means to cut off flow through said second fluid flow path when the pressure drop across said throat exceeds a predetermined amount.

8. The flow meter of claim 2, wherein said means for detecting comprises:

means for measuring a predetermined property of the fluid at an inlet to said first fluid path and actuating said valve means to cut off liquid flow through said second fluid flow path when the measured property of said fluid indicates the presence of liquid flow.

9. The flow meter of claim 1, wherein said diverting means comprises:

a jet to create a negative differential pressure in said second fluid flow path; and a check valve disposed in said second fluid flow path.

10. The flow meter of claim 9, wherein said jet comprises:

a flow restricting nozzle.

11. The flow meter of claims 1, 2, 3, 4, 5, 6, 7, 8, or 10, comprising:

at least one of an expansion chamber and a de-mister provided in the second fluid flow path.

12. The flow meter of claims 1, 2, 3, 4, 5, 6, 7, 8, 9 or 10, wherein:

said first flow measuring device comprises a multi-phase fluid flow measuring device for measuring flow of gas, water and oil through said first fluid flow path; and said outputting means includes means for outputting an indication of the amount of water flow and the amount of oil flow measured by said multi-phase fluid flow measuring device and the combined total amount of gas flow measured by said multi-phase fluid flow measuring device and said second flow measuring device.

13. The flow meter of claim 12, comprising:

at least one of an expansion chamber and a de-mister provided in said second fluid flow path.

14. A method of measuring multi-phase fluid flow of a multi-phase fluid, comprising:

providing a flow meter having first and second fluid flow paths in parallel with each other, said first fluid flow path including a first flow measuring device for measuring both gas and liquid flow and a liquid flow restrictor coupled in series with said first fluid flow measuring device to slow the flow of liquid though said first flow measuring device, said second fluid flow path including a second flow measuring device for measuring gas flow;

detecting liquid flow in said flow meter;

controlling fluid flow through said first and second fluid flow paths by diverting fluid flow through said second fluid flow path when said detecting step does not detect liquid flow in said flow meter and cutting off fluid flow through said second fluid flow path when said detecting step detects liquid flow in said flow meter; and, outputting an indication of the amount of liquid flow through said first flow measuring device and the combined total amount of gas flow through said first and second flow measuring devices.

15. The method of claim 14, wherein:

said detecting step comprises detecting a pressure drop across said flow restrictor; and, said controlling step comprises diverting fluid flow through said second fluid flow path when the detected pressure drop across the restrictor is less than a predetermined threshold and cutting off gas flow through said second flow measuring device when the detected pressure drop exceeds said predetermined threshold.

16. The method of claim 14, wherein said detecting step comprises:

detecting the presence of liquid flow at an inlet to said first fluid path.

17. The method of claim 16, wherein said detecting step comprises:

producing a pressure drop at said inlet when liquid flow is present; and detecting when said pressure drop exceeds a predetermined threshold indicative of liquid flow.

18. The method of claim 16, wherein said detecting step comprises:

passing the fluid at said inlet through a flow restricting nozzle to produce a pressure drop across said nozzle when liquid flow is present.

19. The method of claim 16, wherein said detecting step comprises:

providing at said inlet a venturi device having a throat; and detecting when a pressure drop across said throat exceeds a predetermined threshold.

20. The method of claim 16, wherein said detecting step comprises:

measuring at least one predetermined property indicative of liquid flow at said inlet.

21. The method of claim 14, wherein:

said detecting step comprises producing a negative pressure differential across said second fluid flow path when liquid flow is present; and said controlling step comprises, disposing a check valve in series with said second flow measuring device in said second fluid flow path, said check valve operating to prevent backflow of liquid from an outlet of said first flow measuring device through said second fluid flow path in the presence of said negative pressure differential when said negative pressure differential is produced in the presence of liquid flow.

22. The method of claim 21, wherein said detecting comprises:

passing the fluid through a flow restricting nozzle at said point upstream of said second fluid flow path to produce said negative pressure differential.

23. The method of claims 14, 15, 16, 17, 18, 19, 20, 21 or 22, comprising:

disposing at least one of an expansion chamber and a de-mister in said second fluid flow path to separate liquid from fluid flow in said second fluid flow path.

24. The method of claims 14, 15, 16, 17, 18, 19, 20, 21 or 22, comprising:

using a multi-phase fluid flow measuring device as said first flow measuring device to measure flow of gas, water and oil through said first fluid flow path; and said outputting step comprising outputting an indication of the amount of water flow and the amount of oil flow measured by said multi-phase fluid flow measuring device and an indication of the combined total amount of gas flow measured by said three phase fluid flow measuring device and said second flow measuring device.

25. The method of claim 24, comprising:

disposing at least one of an expansion chamber and a de-mister in said second fluid flow path to separate liquid from fluid flow in said second fluid flow path.

* * * * *